United States Patent
Fujii et al.

(10) Patent No.: US 7,310,253 B2
(45) Date of Patent: Dec. 18, 2007

(54) POWER CONVERSION CIRCUIT CONTROL APPARATUS

(75) Inventors: Toshiyuki Fujii, Tokyo (JP); Naoki Morishima, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 0 days.

(21) Appl. No.: 11/585,079

(22) Filed: Oct. 24, 2006

(65) Prior Publication Data
US 2007/0223261 A1 Sep. 27, 2007

(30) Foreign Application Priority Data
Mar. 22, 2006 (JP) ............................. 2006-079405

(51) Int. Cl.
*H02M 3/24* (2006.01)
*G05F 1/70* (2006.01)

(52) U.S. Cl. ..................... 363/98; 363/41; 363/56.01; 363/132; 323/207

(58) Field of Classification Search ............... 323/207; 363/17, 40, 41, 55, 56.01, 56.03, 56.07, 98, 363/131, 132

See application file for complete search history.

(56) References Cited

U.S. PATENT DOCUMENTS 4,570,214 A * 2/1986 Tanaka ....................... 323/207
5,537,307 A * 7/1996 Hirose et al. ............... 323/207
5,798,633 A * 8/1998 Larsen et al. ............... 323/207

FOREIGN PATENT DOCUMENTS

| JP | 54-82649 | 7/1979 |
| JP | 6-175741 | 6/1994 |

OTHER PUBLICATIONS

Jiang et al., "Applying PWM to Control Overcurrents at Unbalanced Faults of Forced-Commutated VSCs Used as Static Var Compensators," IEEE Transactions on Power Delivery (Jan. 1997), 12:273-278.

* cited by examiner

*Primary Examiner*—Jessica Han
(74) *Attorney, Agent, or Firm*—Finnegan, Henderson, Farabow, Garrett & Dunner, L.L.P.

(57) ABSTRACT

This invention provides a power conversion circuit control apparatus which rapidly detects the voltage amplitude and phase of each phase, corrects the output of a current controller by the mean voltage amplitude and mean phase, and corrects, on the basis of the voltage amplitude and phase of each phase, a voltage amplitude command and voltage phase command to be applied to pulse width modulation. The apparatus can suppress an overcurrent even when the AC voltage is unbalanced, and restart the operation without generating any overcurrent when the circuit is to be reactivated.

6 Claims, 9 Drawing Sheets

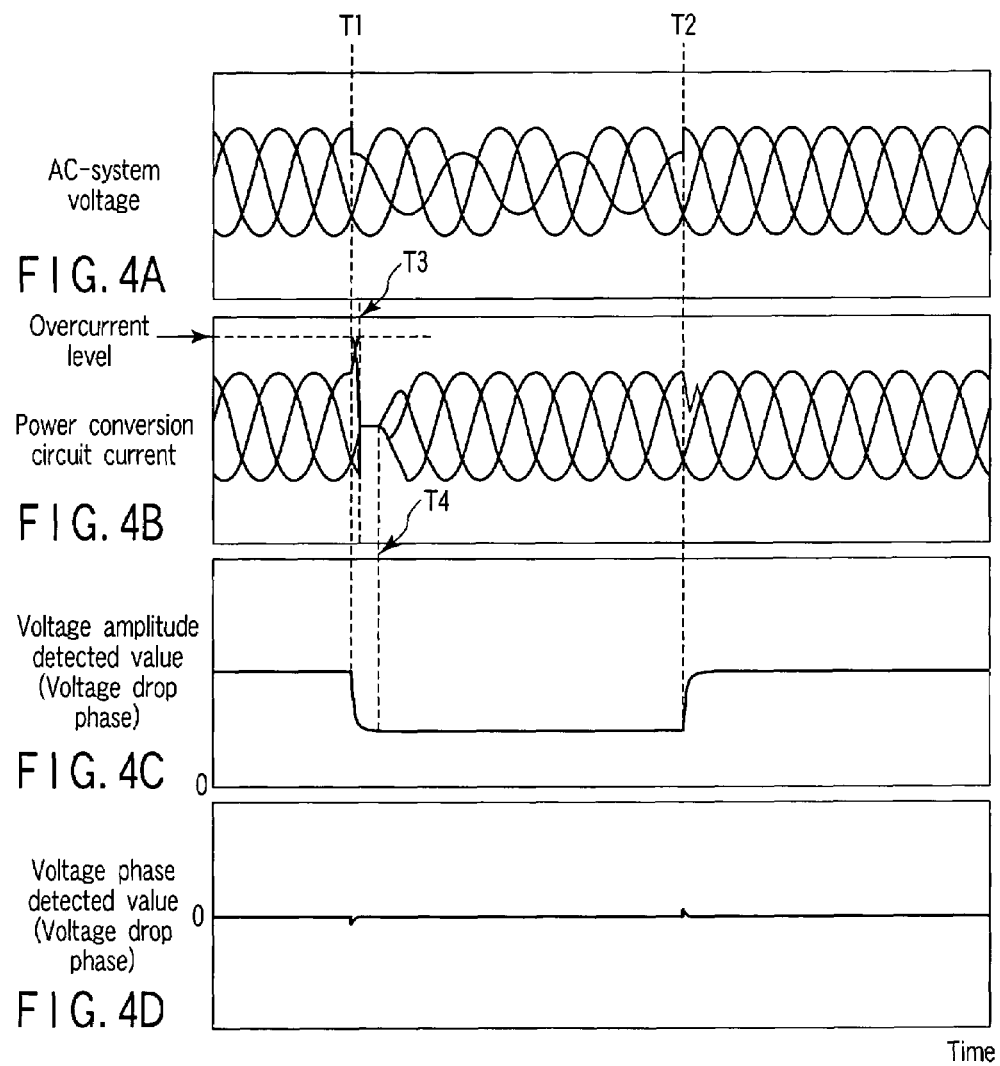

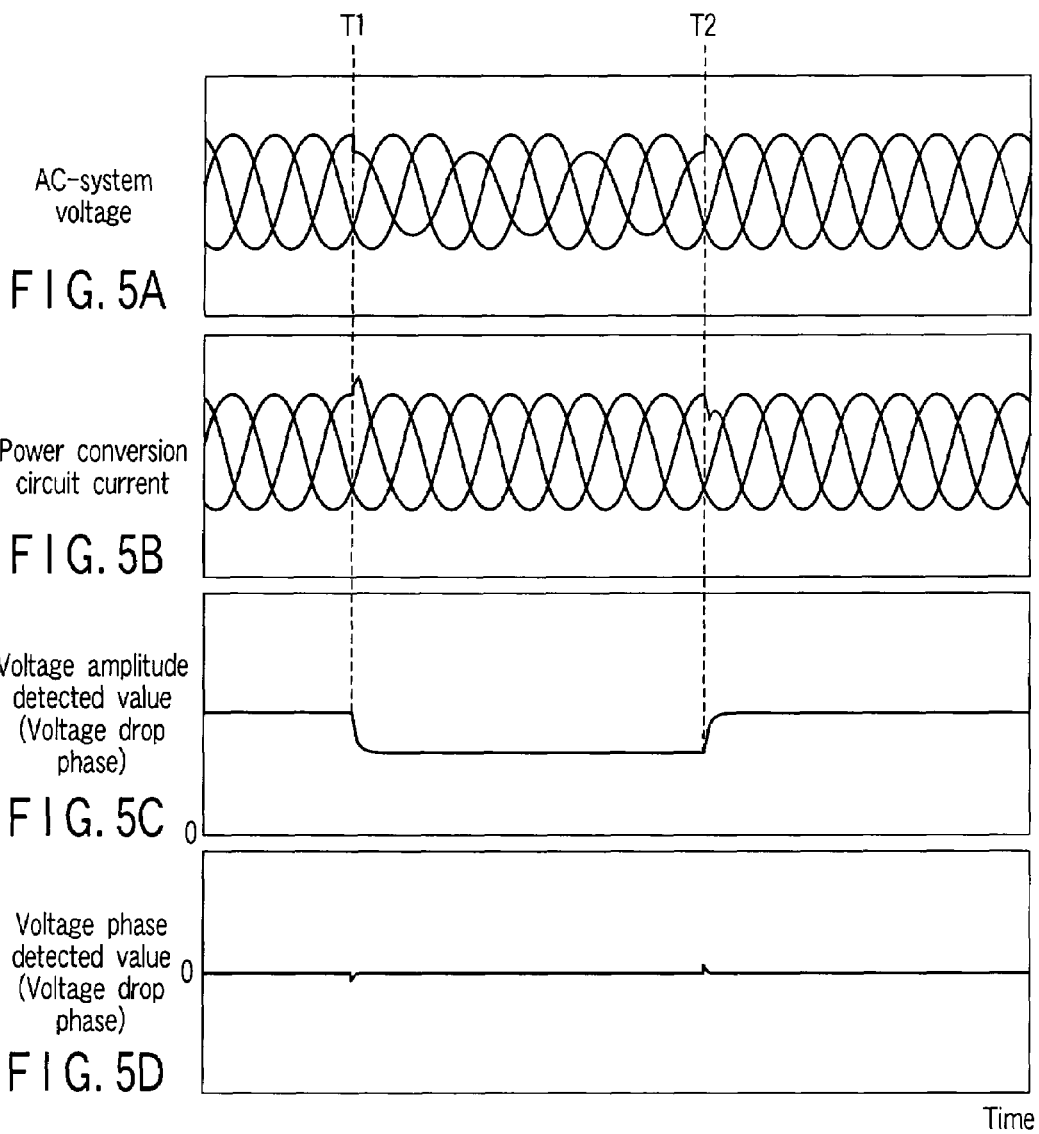

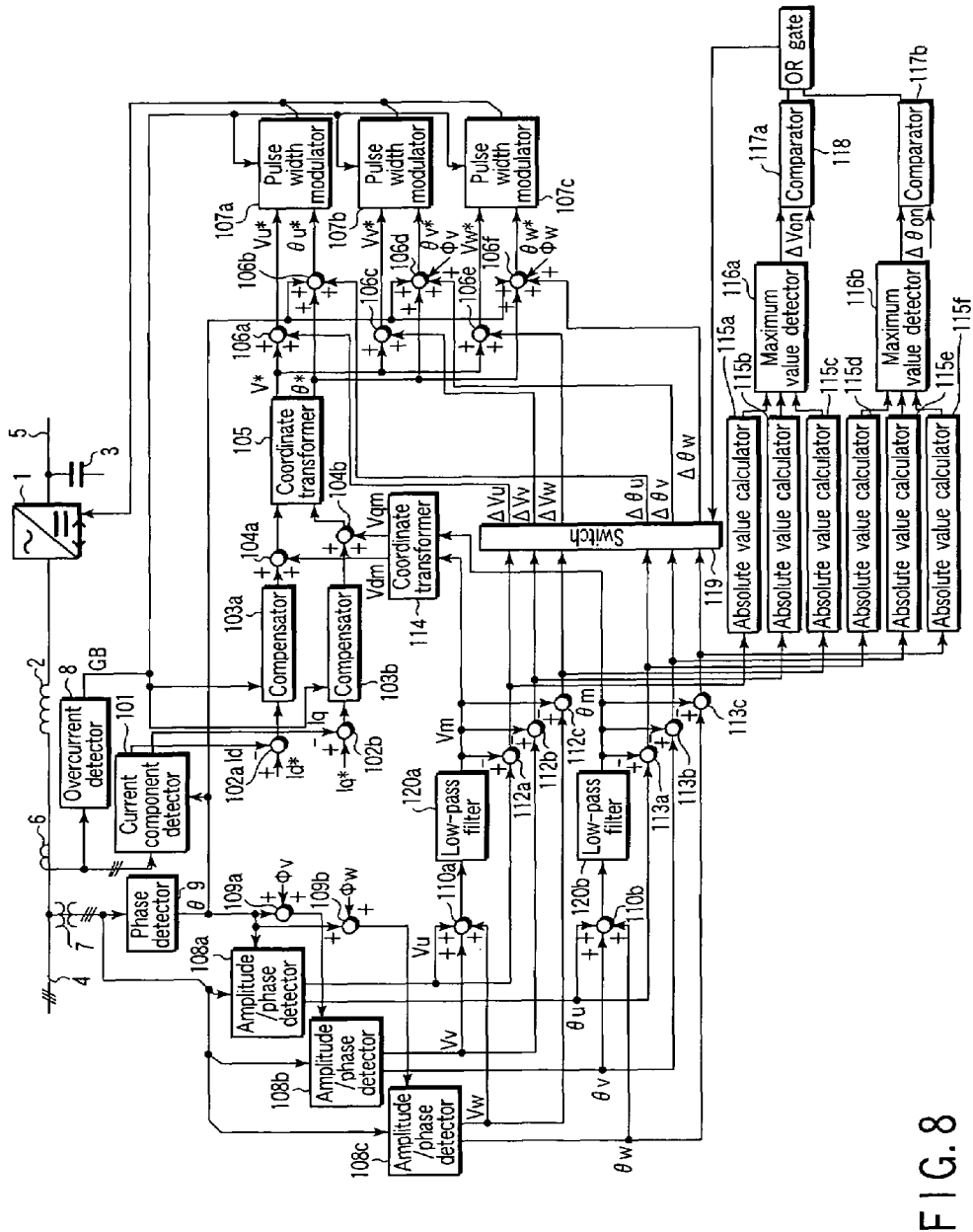
F I G. 8

POWER CONVERSION CIRCUIT CONTROL APPARATUS

CROSS-REFERENCE TO RELATED APPLICATIONS

This application is based upon and claims the benefit of priority from prior Japanese Patent Application No. 2006-079405, filed Mar. 22, 2006, the entire contents of which are incorporated herein by reference.

BACKGROUND OF THE INVENTION

1. Field of the Invention

The present invention relates to a power conversion circuit connected to an AC power system and DC power system and capable of bidirectionally converting AC power and DC power and, more particularly, to a power conversion circuit control apparatus capable of reducing overcurrent of the power conversion circuit when the voltage of the AC power system fluctuates, thereby rapidly reactivating and operating the power conversion circuit even when the current cannot be controlled due to the overcurrent.

2. Description of the Related Art

Conventionally, a power conversion circuit which is connected to power systems, bidirectionally converts AC power and DC power, and modulates the pulse width of the DC voltage can control the active power and reactive power of the AC system, and is used in power interchange of the power systems, and stabilization and fluctuation compensation of the voltage (patent references 1 and 2, and non-patent reference 1).

If a system failure occurs, as disclosed in patent reference 1, a conventional power conversion circuit control apparatus stops controllable elements of the power converter, and continues the operation for a minimum time period necessary to stop the system current. After that, the control apparatus operates the controllable elements of the power converter to allow the current to flow.

In another conventional power conversion circuit control apparatus, as disclosed in patent reference 2, the output voltage of a power converter is matched with the magnitude and phase of the voltage of a power system before the power converter is connected to the power system.

In still another conventional power conversion circuit control apparatus, as disclosed in non-patent reference 1, after a polyphase AC voltage is decomposed into a positive-phase component and negative-phase component, a power converter is controlled by calculating the magnitude and phase of a voltage output command of each phase of the power converter (FIG. 6 in non-patent reference 1). The positive-phase component and negative-phase component are separated by converting the polyphase AC voltage into an orthogonal two-phase AC voltage, and performing calculations from a ¼-period delayed signal (FIG. 2 in non-patent reference 1).

Patent reference 1: Jpn. Pat. Appln. KOKAI Publication No. 6-175741, page 5 (FIGS. 1 and 2)

Patent reference 2: Jpn. Pat. Appln. KOKAI Publication No. 54-82649 (FIG. 4)

Non-patent reference 1: Y. Jiang, A. Ekstrom, Applying PWM to Control Overcurrents at Unbalanced Faults of Forced-Commutated VSCs Used as Static Var Compensators", IEEE Transactions on Power Delivery, Vol. 12, No. 1, pp. 273-278, January 1997, FIGS. 2 and 6

In the conventional power converter control apparatus disclosed in patent reference 1, the failure of the power system may continue when the system current is allowed to flow again. Accordingly, the power converter operates the controllable element while the polyphase AC voltage of the power system is unbalanced. Since this increases the difference between the power converter voltage and power system voltage, an overcurrent flows through the power converter to stop the controllable element again. The repetition of this delays the restart of the operation.

In the conventional power converter control apparatus disclosed in patent reference 2, if the polyphase AC voltage of the power system is unbalanced, the magnitude and phase of the output voltage command form a signal which pulsates at a period twice that of the frequency of the power system. This makes the power converter output voltage different from the power system voltage. In the conventional power conversion circuit control apparatus disclosed in FIG. 6 of non-patent reference 1, the polyphase AC voltage is separated into a positive-phase component and negative-phase component, and this produces a delay of at least a ¼ period. If the period is ¼ or less, therefore, no correct power system voltage can be obtained, and a voltage difference is produced between the power converter and power system. As a consequence, an overcurrent may flow through the power converter.

BRIEF SUMMARY OF THE INVENTION

A power conversion circuit control apparatus according to the present invention comprises a means for correcting an output from a current control means by the mean values of the AC-voltage amplitudes and phases of individual phases, and a means for correcting an AC-voltage amplitude command and phase command from an AC voltage control means by the differences between the voltage amplitude and phase of each phase and the mean values.

The power converter control apparatus according to the present invention individually detects the amplitude and phase of the system voltage of each phase, and controls a controllable element of a power converter. Therefore, the control apparatus can stably operate the power converter even when the voltage of an AC power system is unbalanced.

Also, even when the operation stop period of the controllable element is short, the operation can be restarted without generating any overcurrent. Accordingly, while the number of times of operation of the controllable element is reduced, the operation can be stably restarted even when a pulse width modulation pattern which reduces the voltage harmonics of the converter is used.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the generation description given above and the detailed description of the embodiments given below, serve to explain the principles of the invention.

FIGS. 4A to 4D are timing charts for explaining the functions and effects of the first embodiment of the present invention, in which the operation characteristics of a control apparatus are illustrated;

FIGS. 5A to 5D are timing charts for explaining the functions and effects of the first embodiment of the present invention, in which the operation characteristics of the control apparatus are illustrated;

FIG. 8 is a diagram for explaining the fourth embodiment of the present invention.

DETAILED DESCRIPTION OF THE INVENTION

Embodiments of the present invention will be described below with reference to the accompanying drawing.

First Embodiment

Figure 1:
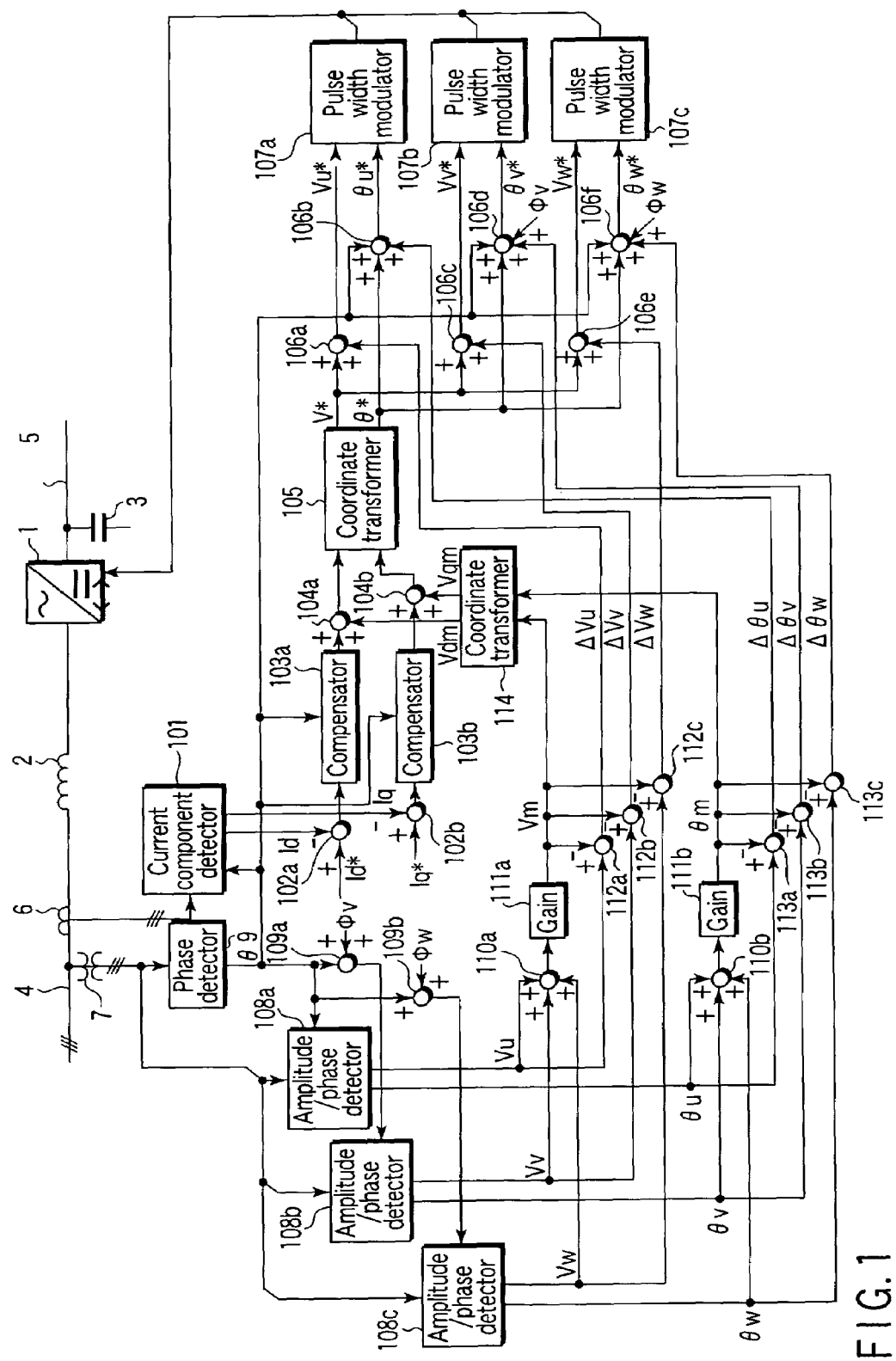
FIG. 1 is diagram for explaining the first embodiment of the present invention.

FIG. 1 is a diagram for explaining a power conversion circuit control apparatus according to the first embodiment of the present invention. A power conversion circuit 1 is, e.g., an inverter which converts a direct current into an alternate current. The AC side is connected to an AC system 4 via a reactor 2, and the DC side is connected to a capacitor 3 and DC system 5.

A voltage detector 7 detects the voltage of the AC system 4, and a phase detector 9 detects a phase $\theta$ of the voltage. A current detector 6 detects current flowing from the power conversion circuit 1 to the AC system 4. This current is converted into a rotating coordinate system based on the phase $\theta$ detected by the phase detector 9, and an active current component Id and reactive current component Iq are detected. Subtracters 102a and 102b respectively calculate deviations between the current components Id and Iq and their command values Id* and Iq*. Current control compensators (current amplifiers) 103a and 103b amplify the deviations.

An adder 109a adds the phase $\theta$ detected by the phase detector 9 and a fixed value $\phi v$ corresponding to a phase difference in a three-phase voltage. An adder 109b adds the phase $\theta$ detected by the phase detector 9 and a fixed value $\phi w$ corresponding to a phase difference in the three-phase voltage. These addition results and the voltage of each phase detected by the voltage detector 7 are input to amplitude/phase detectors 108a to 108c. The amplitude/phase detectors 108a to 108c detect voltage amplitudes Vu, Vv, and Vw and phases $\theta u$, $\theta v$, and $\theta w$ corresponding to the phase $\theta$.

An adder 110a and gain 111a calculate a mean Vm of the voltage amplitudes of the three phases, i.e., the voltage amplitudes Vu, Vv, and Vw. An adder 110b and gain 111b calculate a mean $\theta m$ of the voltage phases $\theta u$, $\theta v$, and $\theta w$.

A coordinate transformer 114 transforms a polar coordinate system using the mean voltage amplitude Vm as a magnitude and the mean voltage phase $\theta m$ as an angle into an orthogonal coordinate system, and calculates mean voltage components Vdm and Vqm. Adders 104a and 104b add the signals obtained by amplifying the current deviations and the mean voltage components. A coordinate transformer 105 transforms the orthogonal coordinates into the polar coordinates, and calculates a voltage amplitude command V* and voltage phase command $\theta^*$.

Subtracters 112a, 112b, and 112c respectively calculate voltage amplitude differences $\Delta Vu$, $\Delta Vv$, and $\Delta Vw$ from the voltage amplitudes Vu, Vv, and Vw and mean voltage amplitude Vm. Subtracters 113a, 113b, and 113c respectively calculate phase differences $\Delta\theta u$, $\Delta\theta v$, and $\Delta\theta w$ from the voltage phases $\theta u$, $\theta v$, and $\theta w$ and mean voltage phase $\theta m$. An adder 106a adds the voltage amplitude command V* and voltage phase difference $\Delta Vu$. An adder 106c adds the voltage amplitude command V* and voltage phase difference $\Delta Vv$. An adder 106e adds the voltage amplitude command V* and voltage phase difference $\Delta Vw$. In this manner, the adders 106a, 106c, and 106e respectively calculate voltage amplitude commands Vu*, Vv*, and Vw* of the individual phases.

An adder 106b adds the voltage phase command $\theta^*$, voltage phase $\theta$, and phase difference $\Delta\theta u$. An adder 106d adds the voltage phase command $\theta^*$, voltage phase $\theta$, and phase difference $\Delta\theta v$. An adder 106f adds the voltage phase command $\theta^*$, voltage phase $\theta$, and phase difference $\Delta\theta w$. In this case, the adders 106d and 106f respectively add fixed values $\phi v$ and $\phi w$ corresponding to phase differences in the three-phase voltage. The outputs from the adders 106b, 106d, and 106f are voltage phase commands $\theta u^*$, $\theta v^*$, and $\theta w^*$ of the individual phases. The voltage phase commands $\theta u^*$, $\theta v^*$, and $\theta w^*$ and voltage amplitude commands Vu*, Vv*, and Vw* of the individual phases are respectively input to pulse width modulators 107a, 107b, and 107c. The pulse width modulators 107a, 107b, and 107c each output a gate control signal which controls ON/OFF of a power semiconductor element of the power conversion circuit 1.

Figure 2:
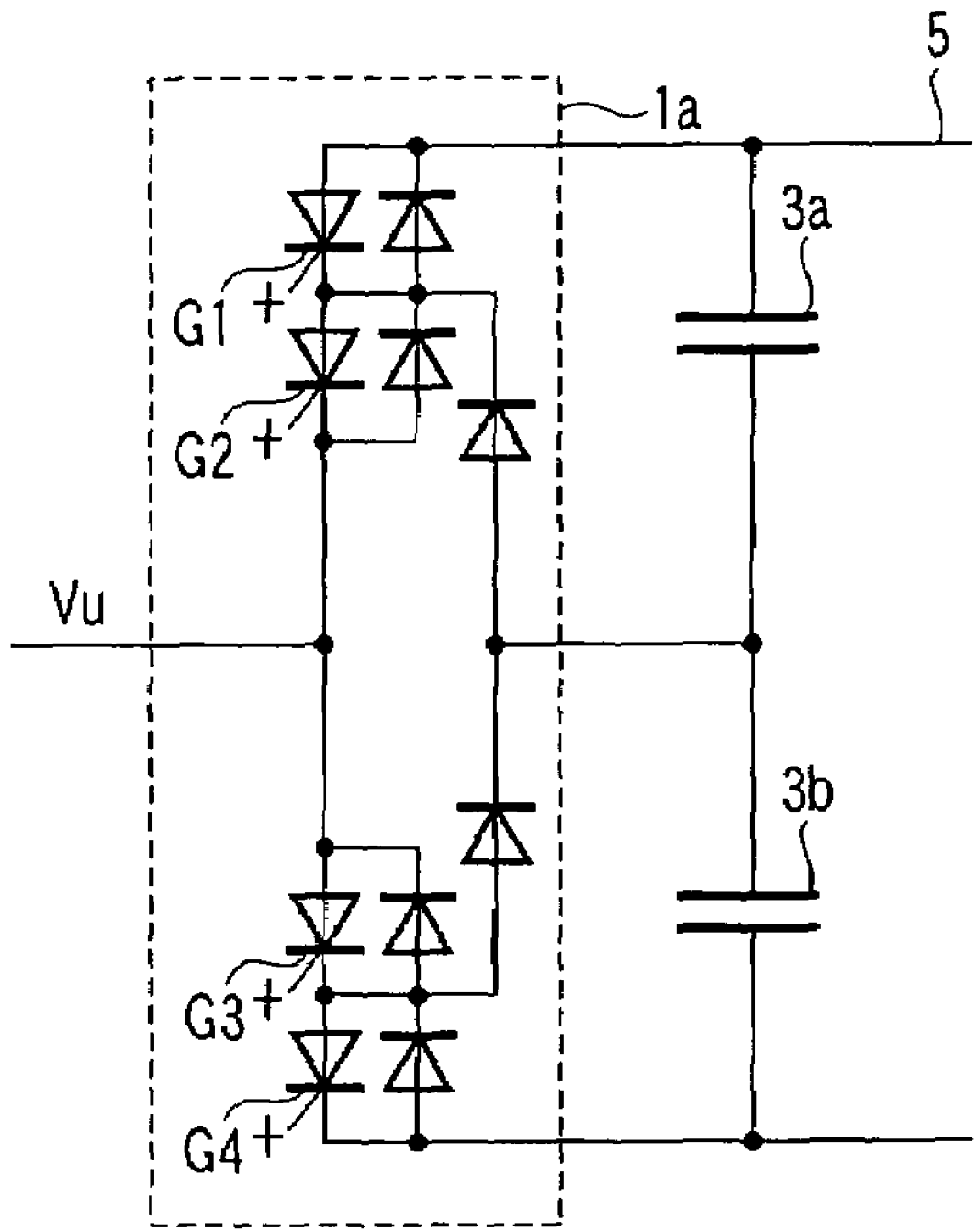
FIG. 2 is a main circuit diagram for explaining a power conversion circuit shown in FIG. 1.

FIG. 2 shows a part of the main circuit of the power conversion circuit 1 shown in FIG. 1. This example is a three-level power conversion circuit comprising a main circuit 1a for one phase (e.g., the U phase of three phases), and capacitors 3a and 3b. The main circuit 1a includes controllable elements (controllable devices) G1 to G4, and two diodes D1 and D2. Although the main circuit configuration of this example is a three-level power conversion circuit, it is also possible to use a voltage-controlled power conversion circuit capable of outputting levels other than three levels, or a combination of power conversion circuits like this.

In practice, the power conversion circuit includes two phases (V and W) of main circuits having the same configuration as the U-phase main circuit 1a. These main circuits are connected between DC systems 5, the capacitors 3a and 3b are connected in series between the DC systems 5, and the connecting point of the capacitors 3a and 3b is connected to the connecting point of the diodes D1 and D2.

The operation will be explained below. From the voltage of the AC system 4 detected by the voltage detector 7, the phase detector 9 detects the phase signal $\theta$ based on the voltage zero-crossing point of, e.g., the u phase as one phase of the AC system 4. The adders 109a and 109b respectively add the phase signal $\theta$ and the fixed values $\phi v$ and $\phi w$ corresponding to the phase differences in the three-phase AC voltage, thereby calculating v-phase and w-phase signals. The phase signal $\theta$ and v-phase and w-phase signals are input to the amplitude/phase detectors 108a, 108b, and 108c of the individual phases. The amplitude/phase detectors 108a, 108b, and 108c respectively detect the voltage amplitudes Vu, Vv, and Vw of the individual phases and the phase differences θu, θv, and θw from the phase signals of the individual phases.

Details of the operation of the amplitude/phase detectors 108a to 108c are disclosed in Japanese Patent No. 3338159, so the explanation thereof will be omitted.

With this configuration, voltages vu, vv, and vw of the AC system 4 can be represented by $$vu=Vu \cdot \sin(\theta+\theta u),$$

$$vv=Vv \cdot \sin(\theta+\theta v+\phi v),$$

$$vw=Vw \cdot \sin(\theta+\theta w+\phi w)$$

Although the phase detector 9 detects the phase signal θ based on the voltage zero-crossing point of the u phase, θu is transiently not always zero due to a detection delay. The adder 110a and gain 111a calculate the mean voltage Vm from the voltage amplitudes Vu, Vv, and Vw of the individual phases. The adder 110b and gain 111b calculate the mean phase different θm from the phase differences θu, θv, and θw. The coordinate transformer 114 transforms the polar coordinates of Vm and θm into orthogonal coordinates, calculates the mean voltages Vdm and Vqm of the orthogonal coordinates by $$Vdm=Vm \cdot \sin(\theta m), Vqm=Vm \cdot \sin(\theta m)$$

and outputs the calculated mean voltages Vdm and Vqm.

From the current of the AC system 4 detected by the current detector 6, a current component detector 101 calculates the reactive current component Iq and active current component Id of the three-phase AC current by rotating coordinate transformation based on the phase signal θ.

When the three phases are balanced in a steady state, currents iu, iv, and iw of the individual phases of the AC system 4 are represented by $$iu=Id \cdot \cos(\theta)+Iq \cdot \sin(\theta)$$

$$iv=Id \cdot \cos(\theta+\phi v)+Iq \cdot \sin(\theta+\phi v)$$

$$iw=Id \cdot \cos(\theta+\phi w)+Iq \cdot \sin(\theta+\phi w)$$

In this case, Iq is a component having the same phase as the voltage of the AC system 4, and Id is a component having a phase difference of 90°. The subtracters 102a and 102b and current control compensators 103a and 103b amplify the deviations between the command values Iq* and Id* of the active current component and reactive current component and Iq and Id to output voltage commands, thereby achieving feedback control and reducing the deviations, so that the current component command values match the detected values.

The adders 104a and 104b respectively add the outputs from the current control compensators 103a and 103b and the mean voltages Vdm and Vqm, thereby calculating the voltage commands Vd* and Vq* on the orthogonal coordinates. The coordinate transformer 105 transforms the orthogonal coordinates into polar coordinates. This transformation yields $$V^*=\sqrt{(Vd^{*2}+Vq^{*2})}, \theta^*=\arctan(Vd^*/Vq^*)$$

Then, the adder 106a adds the voltage command V* and the difference ΔVu between the u-phase voltage amplitude Vu and mean voltage Vm calculated by the subtracter 112a, thereby calculating the u-phase voltage amplitude command Vu*. Likewise, the adder 106b adds the difference Δθu between the phase difference θu and mean phase difference θm calculated by the subtracter 113a, the phase command θ*, and the reference phase θ, thereby calculating the u-phase voltage phase command θu*. Similar calculations are performed for the other phases. θv* and θw* are calculated by adding the phase differences φv and φw between the phases of the three-phase alternate current to the v phase and w phase. The pulse width modulators 107a, 107b, and 107c respectively give ignition pulses corresponding to the voltage amplitude commands Vu*, Vv*, and Vw* and phase commands θu*, θv*, and θw* to the power conversion circuit 1. The power conversion circuit 1 generates an AC voltage corresponding to the voltage commands, and applies the voltage to the reactor 2. The power conversion circuit 1 can generate a voltage proportional to the voltage commands by pulse width modulation.

Figure 3A:
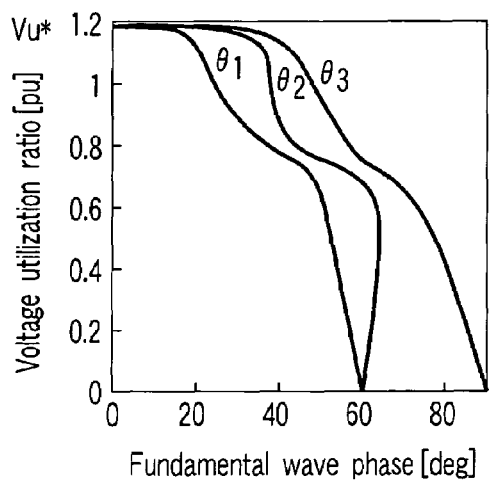
FIGS. 3A and 3B are graphs for explaining an example of the operation of a pulse modulator shown in FIG. 1.
Figure 3B:
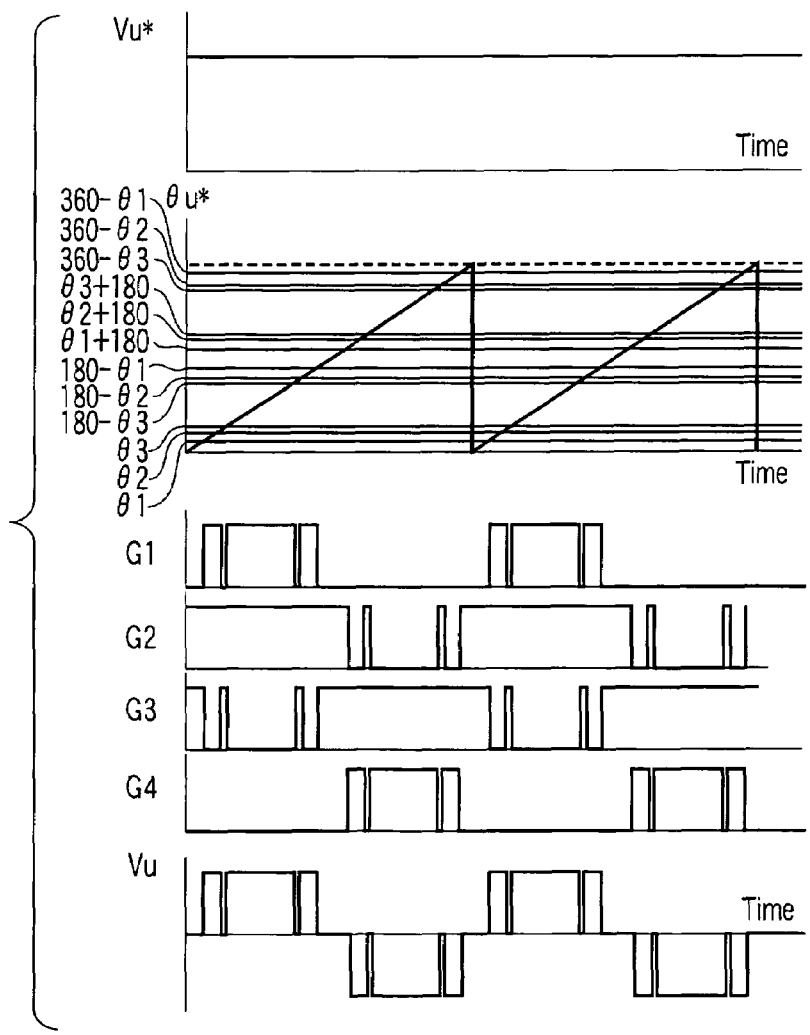

FIGS. 3A and 3B are graphs for explaining an example of the operation of the pulse width modulator 107a.

FIG. 3A is a graph showing examples of ignition phases θ1, θ2, and θ3 for the voltage amplitude command Vu*. These examples of patterns shown in FIG. 3A have a period which is ¼ that of the fundamental wave, and do not generate any fifth and seventh harmonics.

FIG. 3B is a graph showing the operation in the time direction. For example, when the amplitude command Vu* is constant, the ignition phases θ1 to θ3 are obtained from the patterns shown in FIG. 3A, and compared with the phase command θu* by adding 180−θ1, 180−θ2, 180−θ3, θ1+180, θ2+180, θ3+180, 360−θ1, 360−θ2, and 360−θ3 as indicated by the waveforms in the second stage of FIG. 3B. The ignition timings of G1 to G4 are determined by the intersections of the phase command θu* and the triangular carrier wave.

The third to sixth stages of FIG. 3B illustrate the ignition signals of the controllable elements at the timings determined by the intersections in the second stage. Consequently, the AC voltage shown in FIG. 2 has a waveform as shown in the seventh stage of FIG. 3B. In this way, the fundamental wave amplitude of the AC voltage obtained by the patterns shown in FIG. 3A is proportional to the voltage amplitude command Vu*, and the phase is controlled by the phase command θu*. The AC voltage control means which controls the AC voltage by using the patterns as shown in FIG. 3A can reduce the harmonics contained in the AC voltage while reducing the number of times of switching.

The signal contained in the voltage command is the voltage of the AC system 4 except for the outputs from the current control compensators 103a and 103b. In the steady state, therefore, the voltage applied to the reactor 2 is proportional to the outputs from the current control compensators 103a and 103b, so the current can be freely controlled. If the voltage of the AC system 4 is unbalanced, the voltage amplitude command and voltage phase command are immediately corrected by the voltage phase differences ΔVu, ΔVv, and ΔVw and phase differences Δθu, Δθv, and Δθw. Accordingly, an unbalanced fundamental wave voltage can be output as the AC voltage of the power conversion circuit 1 in accordance with the AC system 4. Since no unbalanced voltage is applied to the reactor 2, the current control means can adjust the current to a desired value.

FIGS. 4A to 4D and 5A to 5D are timing charts for explaining the operation characteristics of the power conversion circuit control apparatus according to the present invention. FIG. 4A shows the voltage waveform of the three-phase voltage of the AC system 4 when the voltage of one phase drops at time T1 by, e.g., the falling of a thunderbolt on a transmission line, and the transmission line is removed from the AC system 4 at time T2. FIG. 4B shows an example of the waveform of the alternate current of the power conversion circuit 1. Although the AC-system voltage abruptly changes at time T1, the power conversion circuit 1 does not instantaneously operate, and this produces a voltage difference between the voltage generated by the power conversion circuit 1 and the AC system 4. This voltage difference is applied to the reactor 2 to change the current of the power conversion circuit 1.

In the embodiment having the arrangement shown in FIG. 1, the amplitude and phase of each phase of the AC-system voltage are rapidly detected and fed back, so a change in current can be rapidly suppressed. Therefore, the voltage applied to the reactor 2 is not unbalanced even in the period from time T1 to time T2 during which the voltage is continuously unbalanced. As a consequence, the current can be stably adjusted. FIG. 4C shows the voltage amplitude detected value (e.g., Vu) of a phase for which the voltage has dropped. FIG. 4D shows an example of the phase detected value (e.g., θu) of a phase for which the voltage has dropped.

Like FIGS. 4A to 4D, FIGS. 5A to 5D illustrate waveform examples when the AC-system voltage changes at time T1 and returns at time T2. Compared to FIGS. 4A to 4D, the change in AC-system voltage is large, and the current abruptly changes to exceed the overcurrent level of the power conversion circuit 1. In the embodiment having the arrangement shown in FIG. 1, the overcurrent level is reached at time T3, and the power conversion circuit turns off the power semiconductor to attenuate the current. When the current attenuates, the power conversion circuit starts switching the power semiconductor again at time T4, thereby supplying an current. At this time, the power conversion circuit operates by detecting the amplitude and phase of the changed AC-system voltage. This makes it possible to restart the operation when the voltage applied to the reactor 2 is almost 0, thereby stably adjusting the current without generating any overcurrent again. FIG. 5C shows the voltage amplitude detected value (e.g., Vu) of a phase for which the amplitude voltage of the AC-system voltage has dropped. Since the voltage phase can be rapidly detected as shown in FIG. 5D, the period from the attenuation of the current to the reactivation can be set to, e.g., a ¼ cycle or less.

Note that as the pulse width modulation method, the method of reducing the harmonics contained in the AC voltage while reducing the number of times of switching is exemplified. However, the same effects can be attained by another method such as sub-harmonic pulse width modulation or instantaneous spatial voltage pulse width modulation capable of adjusting the voltage of the power conversion circuit 1 in accordance with the voltage amplitude commands Vu*, Vv*, and Vw* and phase commands θu*, θv*, and θw*.

Second Embodiment

Figure 6:
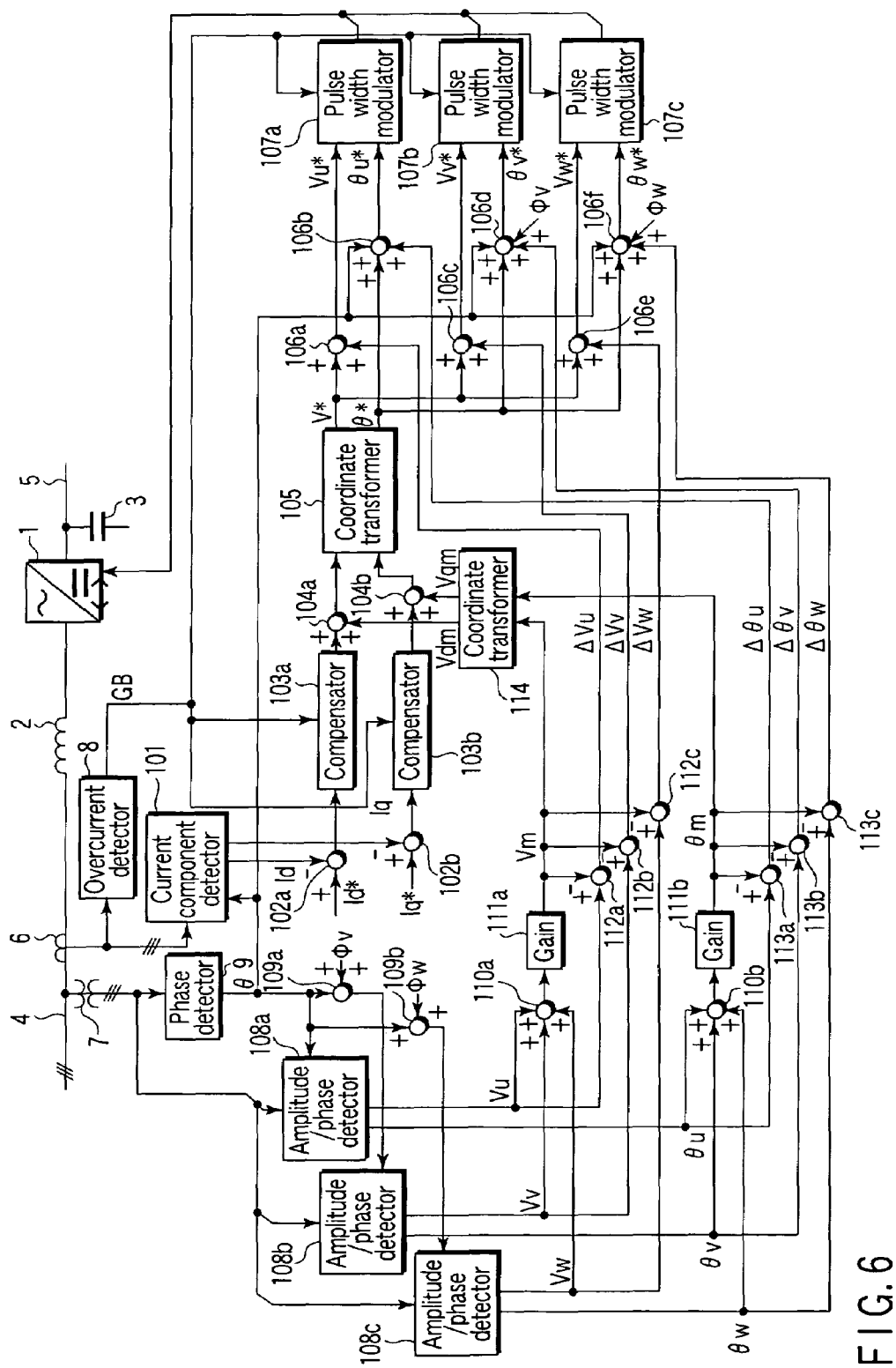
FIG. 6 is a diagram for explaining the second embodiment of the present invention.

FIG. 6 is a diagram for explaining the second embodiment of the present invention. The explanation of the same portions as in FIG. 1 will be omitted. A gate block signal GB from an overcurrent detector 8 which detects an overcurrent by a current signal detected by a current detector 6 is input to pulse width modulators 107a to 107b and compensators (amplifiers) 103a and 103b.

The operation will be explained below. The explanation of the same portions as in FIG. 1 will be omitted. When detecting an overcurrent generated by an abrupt change in AC-system voltage, the overcurrent detector 8 inputs the gate block signal GB to the pulse width modulators 107a to 107c and compensators 103a and 103b, thereby turning off a power semiconductor and attenuating the current. When the current attenuates to be equal to or smaller than a predetermined value and switching of the power semiconductor becomes possible, the overcurrent detector 8 cancels the GB signal and restarts the operation of a power conversion circuit 1. When receiving the GB signal, the compensators 103a and 103b output zero regardless of their inputs. When the GB signal is canceled, the compensators 103a and 103b start amplification.

In this arrangement, if the voltage is unbalanced by, e.g., a line-to-ground fault of an AC system 4, the power conversion circuit 1 generates an overcurrent, and the overcurrent detector 8 designates OFF by the gate control signal. When the current attenuates after that, modulation is restarted by the power semiconductor of the power conversion circuit 1. In this case, the voltage and phase of each phase can be accurately and rapidly detected by an amplitude/phase detector. The pulse width modulator of each phase allows the power conversion circuit 1 to output the voltage of each phase which substantially matches the voltage of the AC system 4. Accordingly, no potential difference is produced in a reactor 2, and the current of the power conversion circuit 1 is controlled from 0 in accordance with current command values Id* and Iq*. This allows the power conversion circuit 1 to keep stably operating at high speed even when the AC system 4 is in an unbalanced voltage state. Since the amplitude/phase detector can accurately detect a voltage even in a ¼ cycle or less, the period during which the gate control signal designates OFF due to an overcurrent can be a ¼ cycle or less.

Third Embodiment

Figure 7:
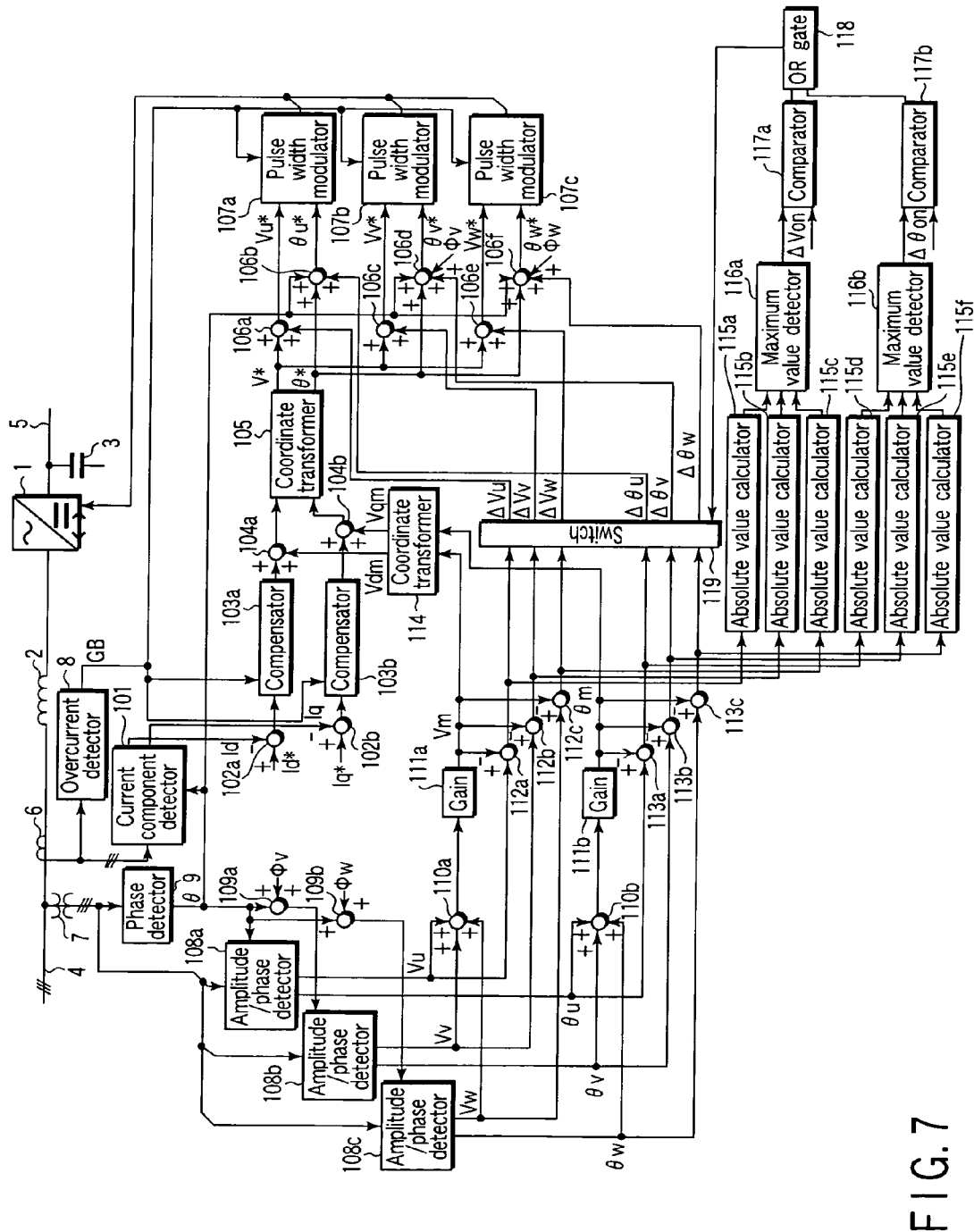
FIG. 7 is a diagram for explaining the third embodiment of the present invention.

FIG. 7 is a diagram for explaining the third embodiment of the present invention. The explanation of the same portions as in FIGS. 1 and 6 will be omitted. Voltage amplitude differences ΔVu, ΔVv, and ΔVw calculated by subtracters 112a to 112c are input to absolute value calculators 115a to 115c, and the absolute values are input to a maximum value detector 116a. Similarly, phase differences Δθu, Δθv, and Δθw calculated by subtracters 113a to 113c are input to absolute value calculators 115d to 115f, and the absolute values are input to a maximum value detector 116b. The outputs from the maximum value detectors 116a and 116b are respectively compared by comparators 117a and 117b. The outputs from these comparators are input to an OR gate 118, thereby driving a switch 119.

The operation will be explained below. The absolute value calculators 115a to 115c and maximum value detector 116a detect the maximum value of the voltage amplitude differences ΔVu, ΔVv, and ΔVw. The comparator 117a compares the detected value with a predetermined value ΔVon. The comparator 117a outputs logic 1 if the voltage amplitude difference is larger than the predetermined value, and outputs 0 if not. Likewise, the absolute value calculators 115d to 115f and maximum value detector 116b detect the maximum value of the phase differences Δθu, Δθv, and Δθw, and the comparator 117b compares the detected value with a predetermined value Δθon. The comparator 117b outputs logic 1 if the phase difference is larger than the predetermined value Δθon, and outputs logic 0 if not. The OR gate 118 ORs the outputs from the comparators 117a and 117b. The OR gate 118 outputs logic 1 if the voltage amplitude difference and/or phase difference is larger than the predetermined value, and outputs logic 0 if not. The output from the OR gate 118 drives the switch 119. If logic 1 is output, all outputs from the switch 119 are 0. If logic 0 is output, the switch 119 outputs the input voltage amplitude difference and phase difference.

In this operation, if the voltage fluctuation of an AC system 4 does not cause any overcurrent of a power conversion circuit 1, i.e., if the voltage amplitude differences ΔVu, ΔVv, and ΔVw and phase differences Δθu, Δθv, and Δθw are small and close to a balanced state, the circuit is controlled by a mean voltage Vm and mean voltage phase θm. For example, when an AC voltage control means is implemented by the patterns shown in FIG. 3A, the third harmonic is generated in the AC voltage of each phase of the power conversion circuit 1. If the fundamental wave voltages of the individual phases are the same, no third harmonic is generated in the line voltage, so no third harmonic is applied to a reactor 2.

If the fundamental wave voltages of the individual phases are controlled to be unbalanced, however, the magnitude of the third harmonic changes from one phase to another. Consequently, a third-harmonic voltage is applied to the reactor 2, and a third-harmonic current flows to the AC system 4.

In the third embodiment, if the unbalanced amount is small, the pulse width modulator outputs a three-phase balanced voltage component of the AC-system voltage. Therefore, the operation can be performed without generating any unnecessary harmonics.

Fourth Embodiment

FIG. 8 is a diagram for explaining the fourth embodiment of the present invention. The explanation of the same portions as in FIG. 7 will be omitted. The output from an adder 110a is input to a low-pass filter 120a having a ⅓ DC gain, and the output from the low-pass filter 120a is output as a mean Vm of the voltage amplitudes of three phases. Similarly, the output from an adder 110b is input to a low-pass filter 120b having a ⅓ DC gain, and the output from the low-pass filter 120b is output as a mean θm of the voltage phases of the three phases.

In the embodiment shown in FIG. 8, if the outputs from subtracters 112a to 112c and 113a to 113c are smaller than a predetermined value, the operation is performed by adding the voltage amplitude mean Vm and phase mean θm to a voltage command. Since the low-pass filters 120a and 120b are so designed as to reduce harmonics, the harmonic components in a voltage amplitude command and phase command reduce, and this reduces variations in ignition pulses of pulse width modulators 107a to 107c. This operation can effectively reduce harmonics caused by ignition variations of a power conversion circuit 1.

Fifth Embodiment

Figure 9:
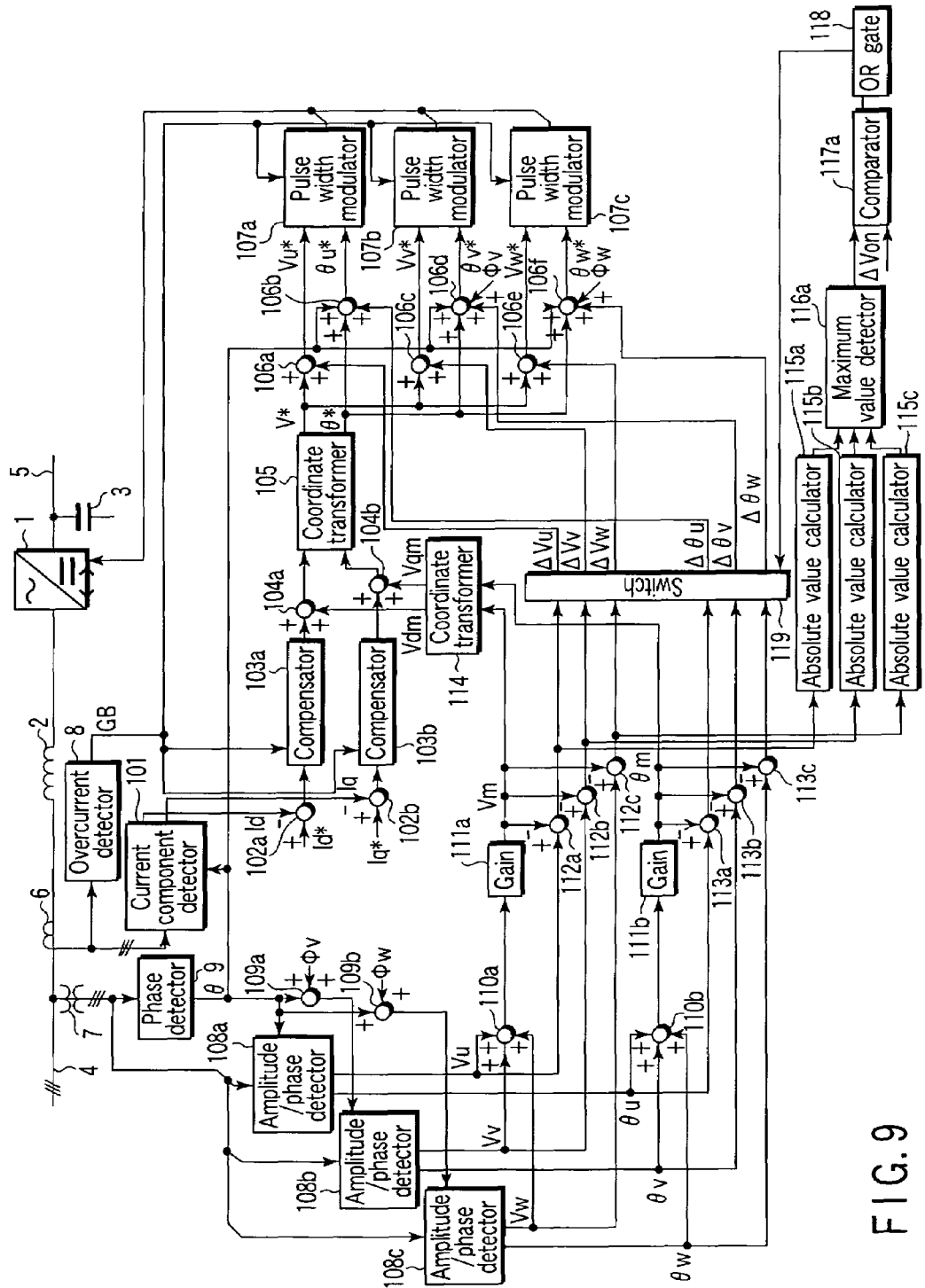
FIG. 9 is a diagram for explaining the fifth embodiment of the present invention.

FIG. 9 is a diagram for explaining the fifth embodiment of the present invention. The explanation of the same portions as in FIG. 8 will be omitted. The output from a comparator 117a drives a switch 119. The basic operation is the same as in FIGS. 5A to 5D. The switch 119 is driven by the comparator 117a, and outputs a voltage amplitude difference and phase difference if the voltage amplitude difference is larger than a predetermined value. If the voltage of an AC system 4 is unbalanced, the magnitude of voltage normally changes, and the phase difference rarely changes alone.

Accordingly, if the unbalanced amount of the voltage of the AC system 4 is small even when the switch 119 is driven by the voltage amplitude difference, a pulse width modulator outputs a three-phase balanced component of the AC-system voltage. Therefore, the operation can be performed without generating any unnecessary harmonics. If the unbalanced amount is large, a voltage amplitude command and voltage phase command are corrected. As a consequence, the operation can be performed by suppressing an overcurrent of a power conversion circuit 1.

Sixth Embodiment

Note that in the above embodiments (FIGS. 1 and 6 to 9), the current control loop is formed by the active current component and reactive current component. In the sixth embodiment, however, a current control loop is formed by two positive-phase current components and two negative-phase current components. In this manner, an apparatus capable of negative-phase current control can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power conversion circuit control apparatus comprising:
    a power conversion circuit which is connected to an AC power system and a DC power supply circuit, and converts a DC voltage into an AC voltage;
    AC voltage detecting means for detecting an AC voltage of the AC power system;
    alternate current detecting means for detecting an alternate current;
    phase detecting means for detecting a reference phase from the detected value of the AC voltage;
    coordinate transforming means for detecting an active current component and a reactive current component from the detected value of the alternate current and the reference phase;
    current control means for controlling an alternate current of the power conversion circuit by adjusting a voltage command value in accordance with an active current component command, a reactive current component command, the active current component, and the reactive current component;
    polar coordinate transforming means for calculating an AC-voltage amplitude command value and an AC-voltage phase command value from an output from the current control means;
    AC voltage control means for controlling switching elements of the power conversion circuit in accordance with the AC-voltage amplitude command value, the AC-voltage phase command value, and the reference phase;
    voltage amplitude/phase detecting means for detecting a voltage amplitude and phase of each phase from the detected value of the AC voltage; and
    mean calculating means for detecting mean values of the voltage amplitudes and phases of individual phases, wherein the output from the current control means is corrected by the mean values of the voltage amplitudes and phases, and the AC-voltage amplitude command value and the AC-voltage phase command value are corrected by differences between the voltage amplitude and phase of each phase and the mean values of the voltage amplitudes and phases.

2. An apparatus according to claim 1, wherein the AC-voltage amplitude command value and the AC-voltage phase command value are corrected by the differences between the voltage amplitude and phase of each phase and the mean values of the voltage amplitudes and phases, if the differences are larger than predetermined values.

3. An apparatus according to claim 1, wherein if the detected value of the alternate current exceeds a first predetermined value, the control of the switching element by the AC voltage control means is stopped, and the output from the current control means is changed to 0, and, if the detected value is not more than a second predetermined value, the control of the switching element is started.

4. An apparatus according to claim 1, wherein the AC voltage control means controls the switching element by a switching pattern which decreases harmonics when three phases are balanced.

5. An apparatus according to claim 1, wherein the mean calculating means for detecting the mean values of the voltage amplitudes and phases of individual phases comprises a low-pass filter.

6. An apparatus according to claim 1, wherein the AC-voltage amplitude command value and the AC-voltage phase command value are corrected by the differences between the voltage amplitude and phase of each phase and the mean values of the voltage amplitudes and phases, if the difference between the voltage amplitude of each phase and the mean value of the voltage amplitudes is larger than a predetermined value.

* * * * *